E. E. MOORE.
TROLLEY FOR ELECTRIC RAILWAYS.
APPLICATION FILED MAY 25, 1918.
1,306,608.
Patented June 10, 1919.
2 SHEETS—SHEET 1.
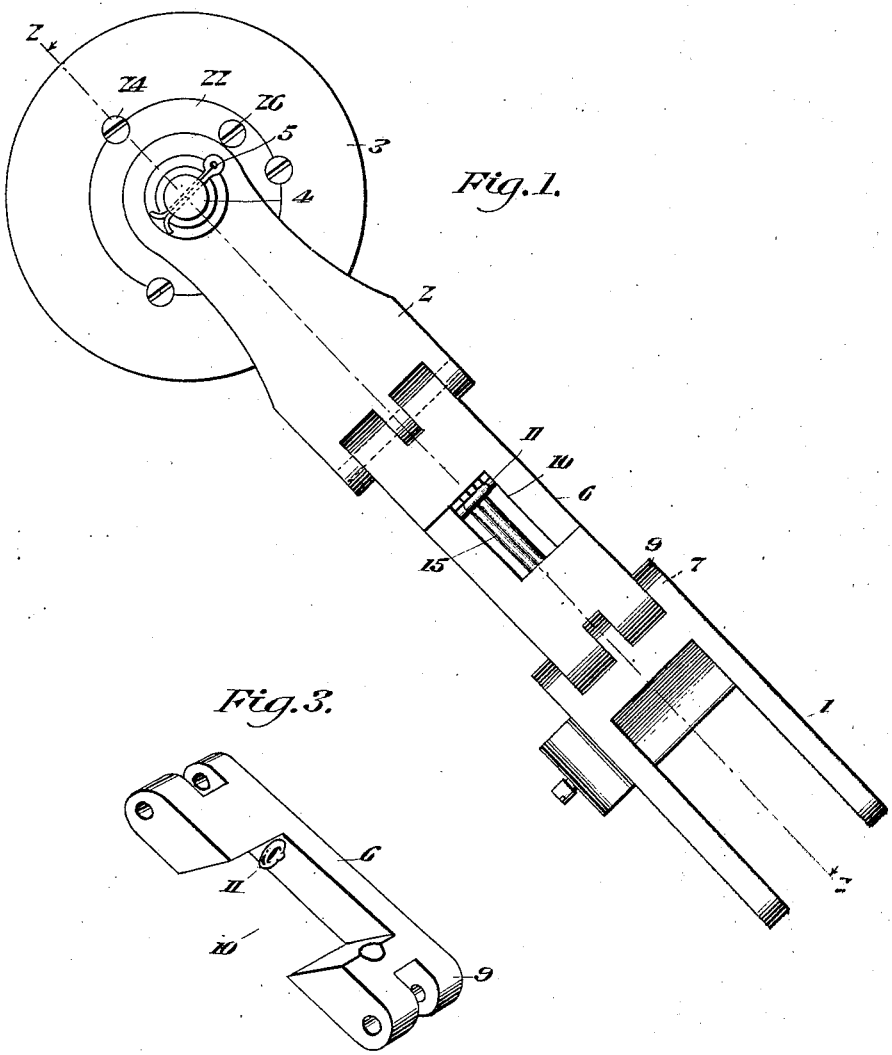
Witnesses
Inventor
E. E. Moore
By Victor J. Evans
Attorney E. E. MOORE.
TROLLEY FOR ELECTRIC RAILWAYS.
APPLICATION FILED MAY 25, 1918.
1,306,608.
Patented June 10, 1919.
2 SHEETS—SHEET 2.
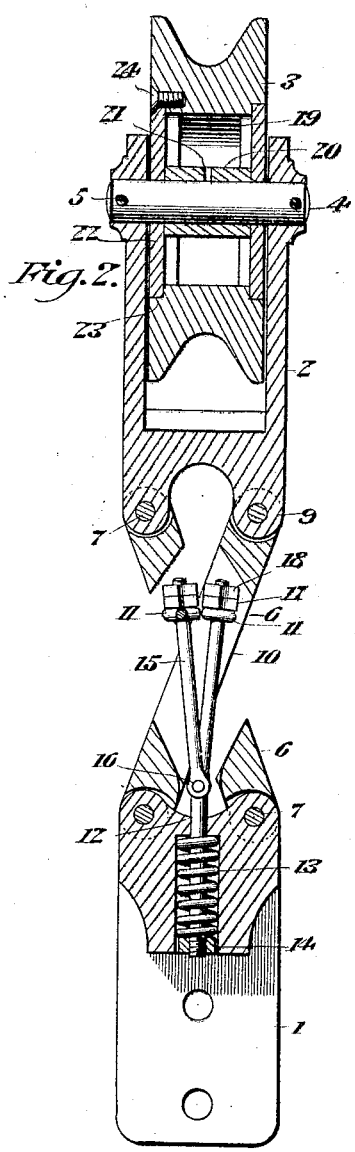
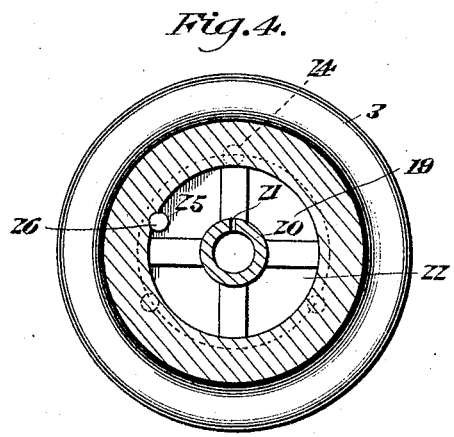
Witnesses
Inventor
E. E. Moore
By Victor J. Evans
Attorney

UNITED STATES PATENT OFFICE.

EDWIN EARL MOORE, OF MIDDLEPORT, OHIO, ASSIGNOR OF ONE-HALF TO MARVIN DE MAINE, OF MIDDLEPORT, OHIO.

TROLLEY FOR ELECTRIC RAILWAYS.

1,306,608.  Specification of Letters Patent.  Patented June 10, 1919.

Application filed May 25, 1918. Serial No. 236,599.

*To all whom it may concern:*

Be it known that I, EDWIN EARL MOORE, a citizen of the United States, residing at Middleport, in the county of Meigs and State of Ohio, have invented new and useful Improvements in Trolleys for Electric Railways, of which the following is a specification.

This invention relates to improvements in trolleys for electric railways, one object of the invention being to effect improvements in the construction of the trolley harp whereby the same is rendered yieldable to a certain extent and the trolley wheel is guided and prevented from climbing off the trolley wire at curves, switches and other like places; another object of the invention being to effect improvements in the construction of a trolley wheel whereby the same is rendered self-lubricating.

The invention consists in the construction, combination and arrangement of devices hereinafter described and claimed.

In the accompanying drawings:—

Figure 1 is an elevation of a trolley constructed and arranged in accordance with my invention.

Fig. 2 is a sectional view of the same, on the plane indicated by the line 2—2 of Fig. 1.

Figs. 3 and 4 are detailed views.

The trolley harp, in accordance with my invention, comprises a lower member 1 which is secured on the upper end of the trolley pole and an upper member 2 in which the trolley wheel 3 is mounted, said upper member being U-shaped and the trolley wheel being arranged to revolve on an axle 4 which axle is arranged in openings in the arms of the member 2 and is secured against casual longitudinal movement by means of cotter-pins 5.

The members 1, 2 are connected together by links 6, the ends of the links being pivotally connected to said members by pins 7 which pass through openings in lugs 9 which are formed at the opposing ends of said members. The links 6 are crossed and each link is recessed in one side as at 10 to clear the other link and to form a space between them. Each link is provided on its inner side at a suitable distance from its upper end with a guide element 11 which is here shown as a screw eye. A tension rod 12 is movable vertically in a central opening with which the member 1 is provided. Said opening has an enlarged lower portion in which is arranged a tension spring 13, said spring being a coiled spring, its upper end bearing against the shoulder formed by said enlarged portion of the opening and its lower end bearing against a tensioning nut 14 which is screwed to and adjustable on the lower portion of said rod. Connecting rods 15 have their lower ends pivotally connected as at 16 to the upper end of the tensioning rod and have their upper portions passed through and slidably arranged in the guide members 11 and provided with nuts 17 and jam-nuts 18 which are screwed thereon.

The tension spring in connection with the tension rod and connecting rods normally holds the members 1, 2 in vertical alinement. Said spring, however, permits the upper member 2 which carries the trolley wheel to yield and to move sidewise with respect to the lower member 1 when the car is passing around a curve or at a switch or other like place so that undue side stress on the trolley wire and trolley wheel is avoided and the trolley wheel is prevented from casually leaving or becoming disengaged from the trolley wire. The tension of the tension spring may be varied as may be required by adjusting the tension rod by means of the adjusting nut, as will be understood.

The trolley wheel is provided with a chamber 19 around its hub 20, said chamber being, for the reception of lubricant and the hub, provided with an opening 21, one or more, to permit the passage of lubricant from the chamber to the axle on which the trolley wheel revolves. The chamber is open at one side of the trolley wheel and the latter is provided with a closure disk or plate 22 for said opening which is fitted in an annular recess 23 which is detachably secured in place by means of screws 24. Said closure disk or plate has a feed opening 25 through which lubricant may be supplied to the chamber, a screw plug 26 being provided for said opening as shown. This construction of the trolley wheel renders the same self-lubricating so that the trolley wheel requires very little attention and need be supplied with lubricant only at considerable intervals of time.

While I have herein shown and described a preferred form of my invention, I would have it understood that changes may be made in the form, proportion and construction of the several parts, without departing from the spirit of my invention and within the scope of the appended claims.

Having thus described my invention, I claim:—

1. A trolley harp comprising lower and upper members, crossed links connecting said members and pivotally connected thereto, a tension rod in one of said members, connecting rods pivotally connected to said tension rod and each connected to one of the links for limited independent movement with respect thereto, and a tension spring which exerts its tension on said tension rod to normally cause the latter and said connecting rods together with the links to hold the said members in vertical alinement and permit the upper member to move transversely independently of the lower member.

2. A trolley harp comprising lower and upper members, crossed links connecting said members and pivotally connected thereto and tensioning means acting on said links to normally hold said members in vertical alinement and permit said upper member to move trasversely under side stress independently of the lower member.

In testimony whereof I affix my signature.

EDWIN EARL MOORE.

Copies of this patent may be obtained for five cents each, by addressing the "Commissioner of Patents, Washington, D. C."